US012792029B2

(12) United States Patent
Kuznetcov et al.

(10) Patent No.: US 12,792,029 B2
(45) Date of Patent: Nov. 10, 2026

(54) SYSTEM AND METHOD OF MONITORING AN INDUSTRIAL ENVIRONMENT

(71) Applicant: Siemens Aktiengesellschaft, Munich (DE)

(72) Inventors: Yury Kuznetcov, St. Petersburg (RU); Igor Milovanovic, Schwaig b. Nürnberg (DE); Georgy Zhemelev, Saint-Petersburg (RU); Anna Kalyuzhnaya, St. Petersburg (RU); Pavel Vychuzhanin, St. Petersburg (RU); Nikolay Nikitin, St. Petersburg (RU); Alexander Khvatov, St. Petersburg (RU)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 353 days.

(21) Appl. No.: 18/286,578

(22) PCT Filed: Mar. 15, 2022

(86) PCT No.: PCT/EP2022/056649
§ 371 (c)(1),
(2) Date: Oct. 12, 2023

(87) PCT Pub. No.: WO2022/218632
PCT Pub. Date: Oct. 20, 2022

(65) Prior Publication Data

US 2024/0192672 A1 Jun. 13, 2024

(30) Foreign Application Priority Data

Apr. 15, 2021 (EP) .................................... 21168517

(51) Int. Cl.
*G05B 23/02* (2006.01)

(52) U.S. Cl.
CPC ................................. *G05B 23/024* (2013.01)

(58) Field of Classification Search
CPC .................................................... G05B 23/024
See application file for complete search history.

(56) References Cited

U.S. PATENT DOCUMENTS 11,307,570 B2 * 4/2022 Trinh .................... G06N 3/045
2016/0379139 A1 12/2016 Eldar et al.

(Continued)

FOREIGN PATENT DOCUMENTS

CN 108351877 A 7/2018
CN 111104466 A 5/2020

(Continued)

OTHER PUBLICATIONS

PCT International Search Report and Written Opinion of International Searching Authority mailed Jun. 13, 2022 corresponding to PCT International Application No. PCT/EP2022/056649 filed Mar. 15, 2022.

(Continued)

*Primary Examiner* — Elias Desta
(74) *Attorney, Agent, or Firm* — Schmeiser Olsen PLLC

(57) ABSTRACT

A system and Method of monitoring an industrial environment are provided. The method includes classifying datapoints of an industrial dataset associated with the industrial environment into one or more classes using a trained model, wherein the trained model is generated using training dataset, wherein the classes are associated with at least one of a physical quality identifier, one of a location identifier and a device identifier associated with generation of the datapoints, and a unit identifier of the datapoints; augmenting the industrial dataset, based on the classification, to include at least one of the physical quality identifier, the location identifier, the device identifier, and the unit identifier along (Continued)

with an associated confidence metric; and monitoring at least one asset or at least one process in the industrial environment using the augmented industrial dataset.

20 Claims, 5 Drawing Sheets

(56) References Cited

U.S. PATENT DOCUMENTS

| | | | | |
|---|---|---|---|---|
| 2020/0225655 | A1* | 7/2020 | Cella | G05B 19/4184 |
| 2021/0012242 | A1 | 1/2021 | Subbiah et al. | |
| 2023/0267368 | A1* | 8/2023 | Paulitsch | G05B 23/0254 706/12 |

FOREIGN PATENT DOCUMENTS

| | | | |
|---|---|---|---|
| CN | 111262722 | A | 6/2020 |
| CN | 111429418 | A | 7/2020 |
| CN | 111931868 | A | 11/2020 |
| CN | 112200323 | A | 1/2021 |
| CN | 112328588 | A | 2/2021 |
| CN | 112491797 | A | 3/2021 |
| WO | 2019216975 | A1 | 11/2019 |

OTHER PUBLICATIONS

Pereira Parente Andrea et al: "Data Augmentation Applied to Machine Learning-Based Monitoring of a Pulp and Paper Process", Processes, vol. 7, No. 12, Dec. 15, 2019 (Dec. 15, 2019), p. 958, XP055927448, CH ISSN: 2227-9717, DOI: 10.3390/pr7120958 Retrieved from the Internet: URL:https://doi.org/10.3390/pr7120958[retrieved on Jun. 2, 2022].

Henze, Dominic et al: "AudioForesight: A Process Model for Audio Predictive Maintenance in Industrial Environments"; 2019 18th IEEE International Conference on Machine Learning and Applications (ICMLA); IEEE; pp. 352-357; XP033719925; DOI: 10.1109/ICMLA.2019.00066; 2019.

Xia Zhan-guo et al:; "Semi-supervised Gaussian process classification algorithm addressing the class imbalance"; doi:10.3969/j.issn.1000-436x.2013.05.005; vol. 34; No. 5; May 2013; May 25, 2013.

Gao Jingkun et al:"A large-scale evaluation of automated metadata inference approaches on sensors from air handling units", Advanced Engineering Informatics 37 (2018) 14-30.

* cited by examiner

SYSTEM AND METHOD OF MONITORING AN INDUSTRIAL ENVIRONMENT

CROSS-REFERENCE TO RELATED APPLICATIONS

This application claims priority to PCT Application No. PCT/EP2022/056649, having a filing date of Mar. 15, 2022, which claims priority to European Application No. 21168517.7, having a filing date of Apr. 15, 2021, the entire contents both of which are hereby incorporated by reference.

FIELD OF TECHNOLOGY

The following relates to a system and method of monitoring an industrial environment. The following also relates to augmenting an industrial dataset to enable condition monitoring of the industrial environment.

BACKGROUND

Condition monitoring applications and insights from an industrial environment are generated from industrial datasets that reflect the operating conditions in the industrial environment. For example, the industrial datasets include sensor datapoints/sensor data from the sensors in the industrial environment. In another example, the industrial datasets include simulation data from applications that simulate the operation of the industrial environment. In yet another example, the industrial datasets include metadata of the sensor data and/or the simulation data.

The sensor data, simulation data and operation and maintenance logs, the metadata (collectively referred as industrial dataset) associated with the industrial environment may be sent to a computing platform that hosts the condition monitoring applications. To enable the condition monitoring applications to provide accurate results, the industrial dataset may include a timestamp, a quality code, a variable name, a physical quality identifier, an origin/location identifier, and a unit identifier. Often, due to the volume of the industrial dataset parameterization may be incomplete or incorrect. Additionally, the condition monitoring applications may require a user to manually input the missing information. Therefore, the process of analyzing and parameterizing an industrial dataset is not only prone to errors but time consuming and may require expert intervention.

Accordingly, the present techniques to analyze an industrial dataset may benefit from improvements.

SUMMARY

An aspect relates to augmenting the industrial dataset to enable accurate condition monitoring of the industrial environment.

In an example, the aspect is achieved by a method of monitoring an industrial environment, the method comprising classifying datapoints of an industrial dataset associated with the industrial environment into one or more classes using a trained model, wherein the trained model is generated using training dataset, wherein the classes are associated with at least one of a physical quality identifier, one of a location identifier and a device identifier associated with generation of the datapoints, and a unit identifier of the datapoints: augmenting the industrial dataset, based on the classification, to include at least one of the physical quality identifier, the location identifier, the device identifier, and the unit identifier along with an associated confidence metric; and monitoring at least one asset or at least one process in the industrial environment using the augmented industrial dataset.

In another example, the object is achieved by a method of training the trained model, the method comprising: determining the training dataset from the historical sensor datapoints and the metadata, wherein the historical sensor datapoints and the metadata are annotated with the classes: selecting one or more feature extractor, wherein the feature extractor perform at least one of quantile distribution, frequency spectrum, and wavelet decomposition: training the trained model to output the classes associated with at least one of the physical quality identifier, the location identifier, the device identifier, and the unit identifier in response to the feature vectors determined from one or more feature extraction models; and validating the trained model by comparing an output of the trained model with the training dataset.

Another example includes a system for monitoring the industrial environment, the system comprising: at least one processor: at least one memory unit communicatively coupled to the processor configured to store machine readable instructions that when executed implement the method steps disclosed herein.

Yet, another example includes a computer program product (non-transitory computer readable storage medium having instructions, which when executed by a processor, perform actions) including program instruction to be executed by at least one processor, wherein executing the program instruction causes the at least one processor to perform a method disclosed herein.

Another example includes a data stream of datapoints of industrial dataset associated with an industrial environment, wherein the data stream has at least partially been derived using methods herein.

As used herein "industrial environment" refers to a facility that for fabrication, manufacture, production that may be semi or completely automated. For example, industrial environment includes a manufacturing plant used to manufacture consumer goods. In another example, the industrial environment may include power plant facility. Other examples of industrial environment include laboratory automation environment, building automation environment and the like. Further, according to embodiments of the present invention, industrial environment may include a combination of the aforementioned examples.

The industrial environment typically includes multiple systems and devices that perform one or more operations. The systems and devices are collectively referred to as assets. Further, the operations performed by the systems and devices result in performance of one or more processes in the industrial environment. Through embodiments of the present invention, the condition of the assets (systems and devices) are monitored based on industrial datasets that are related to their operating conditions.

As used herein "industrial dataset" refers to sensor datapoints generated by sensors in the industrial environment; and metadata in the sensor data and/or from at least one of simulation models, lifecycle database, and manufacturing operations database, wherein the metadata comprises at least one of variable identifier, an asset identifier, and an asset type. For example, the variable identifier may relate to the physical quality identifier such as Temperature, Pressure, Torque, etc. The asset identifier includes identification of the asset associated with one or more datapoints in the industrial dataset such as identifier for the temperature sensor of a fabricated body and identifier of the fabricated body. In the above example, the asset type indicates whether the metadata relates to temperature sensor or fabricated body.

Further, "datapoints of the industrial dataset" refers to comprises the sensor datapoints and the metadata. Embodiments of the present invention are augmenting the different data that is related to the industrial environment. In some embodiments, the present invention analyses the time-series sensor data and in other embodiments, a log of the metadata may be analyzed and augmented.

In embodiments, the method of the present invention classifies the datapoints of the industrial dataset into one or more classes using the trained model. As used herein the classes are associated with one or more categories such as physical quality identifier, a location identifier and a device identifier associated with generation of the datapoints, and a unit identifier. Accordingly, the trained model is trained using a training dataset that is used to identify and classify the datapoints. The classification of the datapoints may also result in classification of the sensors from which the datapoints originate. Therefore, in embodiments, the method of the present invention may also include classification of the sensor from which the datapoints of the industrial dataset originate.

Examples for the physical quality identifier includes Pressure, Power, Temperature, Acceleration, Force/Plunge Force/Electrode Force, Torque, Magnetic Field, Current, Thickness, Time etc. The location identifier includes the system associated with the datapoint. For example, a rotor, stator, shoulder tool, pin tool, laser head, electrode or build plate. The device identifier narrows down the location of the datapoint to the sensor generating the datapoint. Further, the device identifier includes sensor functional location. The unit identifier refers to unit of measure. Examples for unit identifier includes degrees Celsius/Fahrenheit, inches, meters, Watts, Newton, Pascal, Amperes, Joules, seconds, etc. A person skilled in the conventional art will appreciate that these examples are not limiting in nature and are dependent on the industrial environment and the type of industry.

The classification of the datapoints is based on the training dataset. In an embodiment, the training dataset is a validated dataset associated with the industrial environment comprising a mapping of historical sensor datapoints from the industrial environment and the metadata to the classes. For example, the training dataset may include indications such as datapoints {25.3, 26.1, 28.0, . . . } are values of a "temperature" sensor at electrode head measured in Celsius. The datapoints {290.1, 289.5, 300.1, . . . } are values of a "turbine active power" sensor measured in MegaWatt. The indications may be extracted from software that manage the industrial environment at an Enterprise Level i.e., ERP/Product Lifecycle Management (PLM) software or from Simulation software with 1D, 2D and 3D simulation models of the industrial environment.

Alternatively, the indications may be based on expert input provided for the historical sensor datapoints.

The classification of the datapoints may be performed by determining clusters in the industrial dataset. The generation of the clusters is an embodiment by which the datapoints may be classified. The clusters are determined based on the metadata and/or representative features identified for the datapoints in the industrial dataset. For example, the metadata may include the variable identifier, the asset type but be incomplete without the asset identifier and the unit identifier. The clusters are determined based on the variable identifier and the asset type.

In some embodiments, particularly when there is no metadata, or the metadata is insufficient, representative features from the industrial dataset including the time-series sensor datapoints are used to determine the clusters. In embodiments, the method of the present invention may accordingly include determining the representative features. A person skilled in the conventional art will appreciate that the below method steps can be further applied to all datapoints in the industrial dataset.

To determine the representative features, the method may include extracting one or more segment of the sensor datapoints for a predefined time period and processing the segment of sensor datapoints by filtering, resampling and/or interpolating the segmented sensor datapoints. By processing the sensor datapoints the irregularities in the sensor datapoints are addressed. For example, the irregularities may include irregular timestamps, gaps in the sensor datapoints and outlier.

In embodiments, the method may further include extracting features from the processed sensor datapoints, wherein extracting the features comprises generating at least one of quantile distribution, frequency spectrum, and wavelet decomposition, of the processed sensor datapoints; and extracting the features in at least one of the quantile distribution, the frequency spectrum, and the wavelet decomposition of the processed sensor datapoints. The embodiment proposes use of the feature extractors such as quantile distribution, frequency spectrum, and wavelet decomposition. Other feature extractors include outlier detector, model-based pattern detector and autoencoder.

In embodiments, the method may also include reducing the features to feature vectors based on a predefined feature length. The output of each feature extractor is reduced to a "feature vector" (or matrix) of a fixed length. The predefined feature length is specific to the feature extractor. The feature vector is shorter than original time series sensor data but representative. In an embodiment, the predefined feature length may be explicitly configured in the feature extractor output size or by using the Auto-Encoder which is based on neural networks. In embodiments, the method includes determining the representative features by concatenating the feature vectors based on the extent by which the feature vectors enable discrimination of the industrial dataset, the sensor datapoints. The feature vectors/matrices after concatenation form a bigger vector/matrix, also of a fixed length. The resulting vector/matrix is called "embedding", or fingerprint. The representative features include a fixed length representation of the sensor datapoints in a reduced-dimension space. By processing the sensor datapoints and using the autoencoder, the step of embedding is containing the most representative features. The features are referred as representative features as they allow better quality of generalization and discrimination of the sensor datapoints. In an embodiment, the clusters in the sensor datapoints may be determined prior to concatenation. The feature vectors are generated and embedded such that the clusters can be identified in the sensor datapoints.

In some embodiments, the method may include defining the one or more classes as outputs of the trained model. In embodiments, the method may further include predicting the classes by the trained model in response to the feature vectors, wherein the trained model comprises at least one of K-means clustering model, an ensemble tree model and a neural network model. In embodiments, the method may also include determining the confidence metric for the classes, wherein the confidence metric is represented as a percentage indicating confidence of the classes predicted by the trained model. Accordingly, the trained model receives the representative features as input and outputs one or more associated classes with estimation of confidence for each class output. In some embodiments, the class output may be ranked based on the confidence metric.

In an embodiment, the method may include determining the confidence metric based on distances of the between the feature vector and cluster centers of K-means clusters generated by the K-means clustering model in response to the feature vectors. In another embodiment, the method may include determining the confidence metric as probabilities of the classes predicted by the neural network in response to the feature vectors. The present invention proposes multiple methods of predicting the classes and the confidence metric that can be used individually and in combination.

In another embodiment, the classification of the datapoints in the industrial dataset may be performed by determining orders of magnitude for the training dataset and comparing the orders of magnitude for the datapoints with orders of magnitude for the classes, and the class associated with the unit identifier in the training dataset. In embodiments, the method may further include inferencing heuristically the unit identifier associated with the datapoints based on the comparison. Accordingly, in embodiments, the method may include enabling definition of rules based on which the heuristic inferencing is performed.

Some embodiments of the present invention allow an expert or user to confirm the classification prior to augmentation of the industrial dataset. Accordingly, in embodiments, the method may include displaying the classes and the associated confidence metrics:

validating the classes based on feedback from a user of a system for monitoring the industrial environment; and retraining the trained model based on the feedback. Therefore, the present invention incorporates the expert input for further classifications.

In embodiments, the method of the present invention also includes training of the trained model. A person skilled in the conventional art would appreciate that the term "trained model" is used to maintain consistent reference to the method steps as above. Accordingly, the trained model may also be referred to a as a model (prior to training). Further, the steps of training the model may be performed prior or during the use of the trained model.

The training of the model involves determining the training dataset from the historical sensor datapoints and the metadata, wherein the historical sensor datapoints and the metadata are annotated with the classes. Accordingly, the training dataset acts as a ground truth based on which the model is trained. Further, in embodiments, the method of training includes selecting one or more feature extractor, wherein the feature extractor performs at least one of quantile distribution, frequency spectrum, and wavelet decomposition and training the trained model to output the classes associated with at least one of the physical quality identifier, the location identifier, the device identifier, and the unit identifier in response to the feature vectors determined from one or more feature extraction models. Furthermore, in embodiments, the method of training includes validating the trained model by comparing an output of the trained model with the training dataset.

Accordingly, in operation, the training the model may involve:

1. Choosing representative training dataset where the industrial dataset is already labeled with ground truth classes).
2. Choosing Feature Extractors and parameters of the feature extractors.
3. Training the Feature Extractors based on the training dataset
4. Testing the Feature Extractors and evaluating the prediction quality.
5. If the quality is not satisfactory then go to step 1 or 2, the Feature Extractor choice may be modified and the remaining steps are repeated. Alternatively, the parameters of the Feature Extractor is retrained or tuned to achieve the desired quality.

In an embodiment, the training also includes auto-encoding, by an autoencoder, features generated from the one or more Feature Extractors into feature vectors based on a predefined feature length, wherein the features are determined from at least one of variability and distribution of the sensor datapoints, spectral histogram, and wavelets. By reducing the features to the feature vectors, the auto-encoders ensure that the feature vectors contain the most representative features.

In another embodiment, when cluster-based classification is used to analyze the industrial dataset the feature vectors are further concatenated. Accordingly, in embodiments, the method of training may include concatenating the feature vectors based on the extent by which the feature vectors enable discrimination of datapoints in the training dataset. By training the model according to embodiments of the method hereinabove, the present invention can be tailored to multiple industrial environments.

The above-mentioned methods enable monitoring of an industrial environment. As used herein "monitoring" refers to performing one or more predictive and prognostic condition monitoring analysis on the assets and the operations performed in the industrial environment. Accordingly, in embodiments, the method may include displaying operating conditions associated with the asset and/or the process based on the augmented industrial dataset; and displaying a predicted error condition in the asset and/or the process determined based on the operating conditions. For example, the augmented industrial dataset is provided as input to a condition monitoring application hosted on a cloud computing platform. In another example, the condition monitoring application includes a data augmentation module configured to perform the method steps of the present invention.

Additionally, in embodiments, the method may include modifying one or more control parameters of the asset based on the predicted error condition; and modifying one or more process parameters for carrying out the process in the industrial environment based on the predicted error condition. For example, a condition monitoring application may be hosted on an industrial control system configured to supervise and control the industrial environment. The augmented industrial dataset serves as a basis on which the condition monitoring analysis is performed. Therefore, the augmented industrial dataset not only enables accurate insights into the operation of the industrial environment, but it also further enables accurate control decisions that are taken in the industrial environment.

Embodiments of the present invention can be implemented as a modular solution accessible via a software plug-in on the cloud computing platform. The solution may be tailored to a new industrial environment by retraining the trained model based on the training dataset of the new industrial environment. Accordingly, the trained model may be stored on a model database and accessed via the cloud computing platform. In an embodiment, the present invention may include receiving a plurality of industrial datasets associated with one or more industrial environments at a computing platform, wherein the computing platform is configured to perform at least one of the method steps described hereinabove.

Embodiments of the present invention allow categorization of not only the time series automatically also metadata associated with the industrial environment. The combination of the supervised and unsupervised labeling process reduces the dependency on time expensive evaluation by the experts and reduce the costs of data housekeeping and quality control. Further, the reduced-order dataset representation (embedding) that can be tailored to various domains and thus encapsulate domain specifics while the classification itself does not dependent the time series specifics.

The foregoing has outlined rather broadly the technical features of the present disclosure so that those skilled in the conventional art may better understand the detailed description that follows. Additional features and advantages of the disclosure will be described hereinafter that form the subject of the claims. Those skilled in the conventional art will appreciate that they may readily use the conception and the specific embodiments disclosed as a basis for modifying or designing other structures for carrying out the same purposes of the present disclosure. Those skilled in the conventional art will also realize that such equivalent constructions do not depart from the scope of the disclosure in its broadest form.

BRIEF DESCRIPTION

Some of the embodiments will be described in detail, with reference to the following figures, wherein like designations denote like members, wherein.

Figure 3:
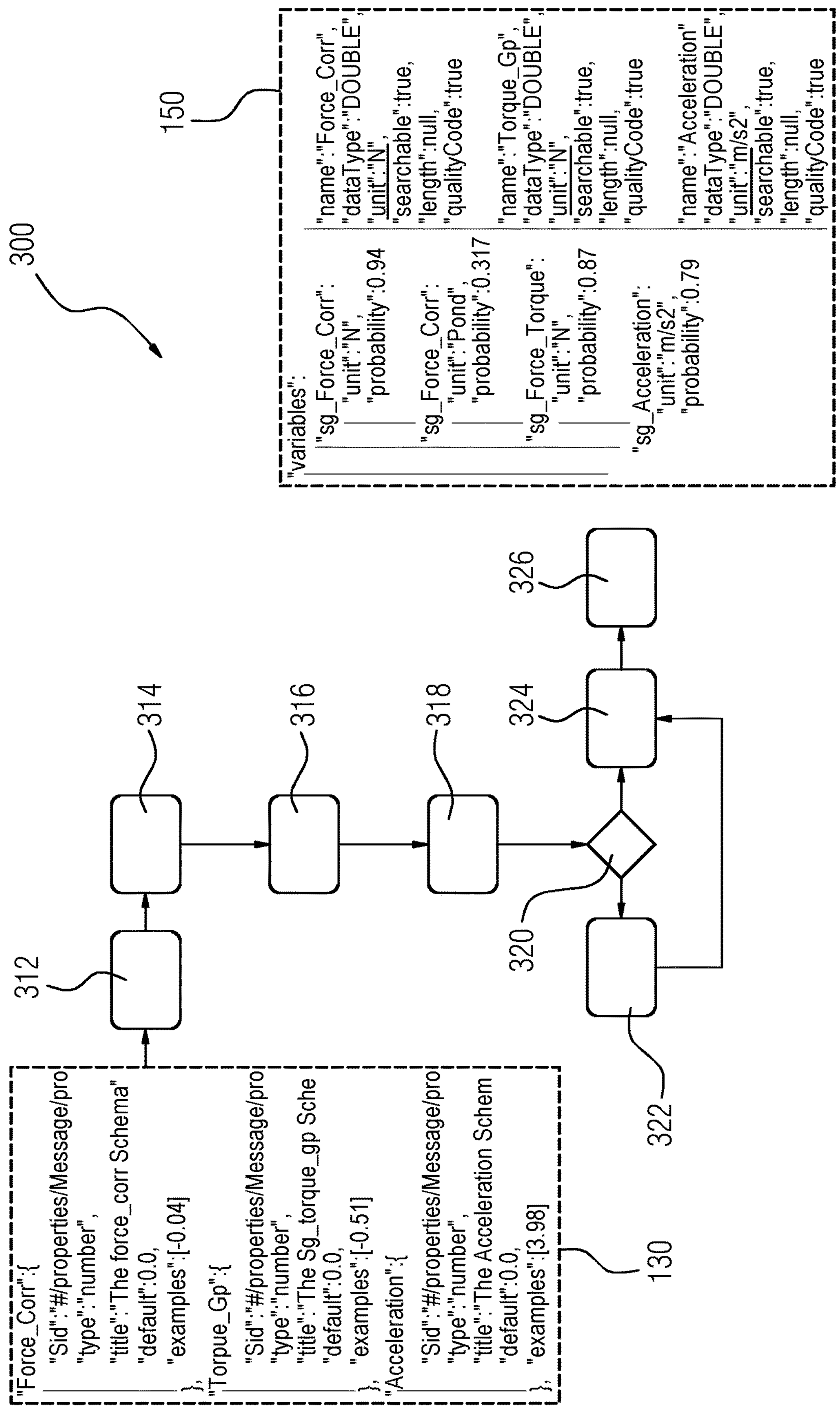
Figure 4:
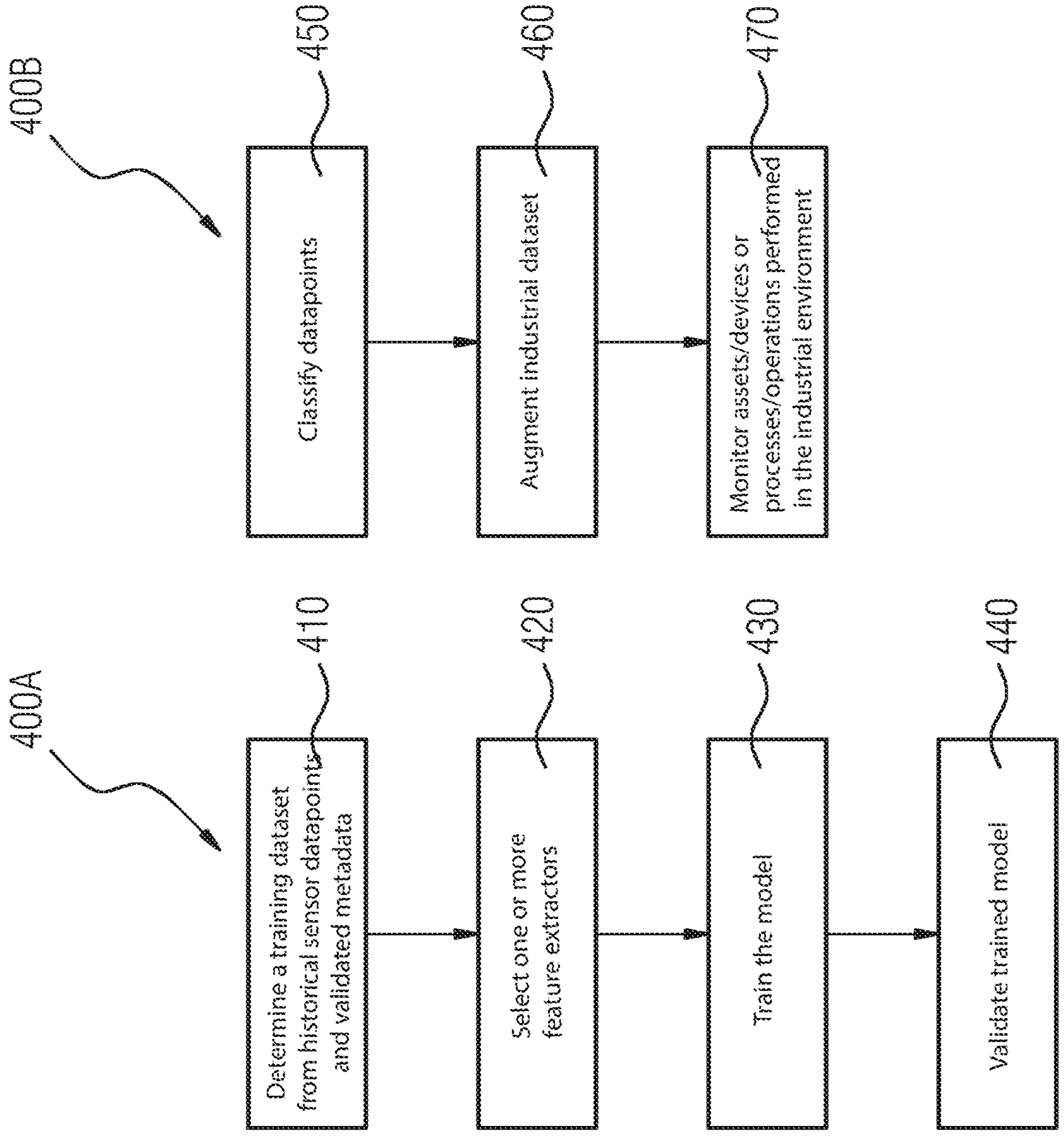
Figure 5:
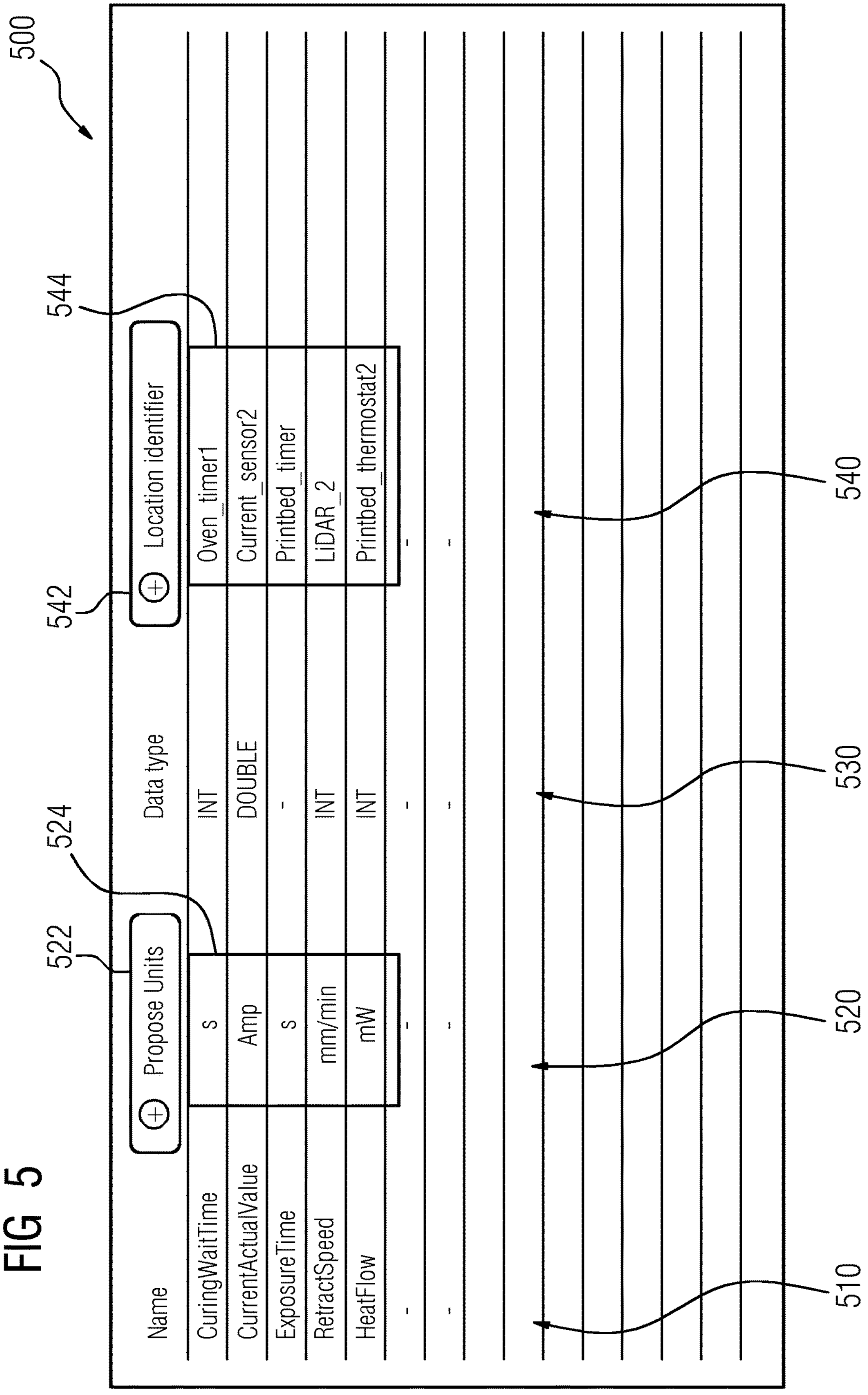

FIG. 3 illustrates a method of augmenting an industrial dataset, according to an embodiment of the present invention; and FIG. 4 illustrates a method of monitoring an industrial environment, according to an embodiment of the present invention; and FIG. 5 illustrates a Graphical User Interface (GUI) of a system for monitoring an industrial environment, according to an embodiment of the present invention.

DETAILED DESCRIPTION

In the following description, for purpose of explanation, numerous specific details are set forth in order to provide a thorough understanding of one or more embodiments. It may be evident that such embodiments may be practiced without these specific details.

Figure 1:
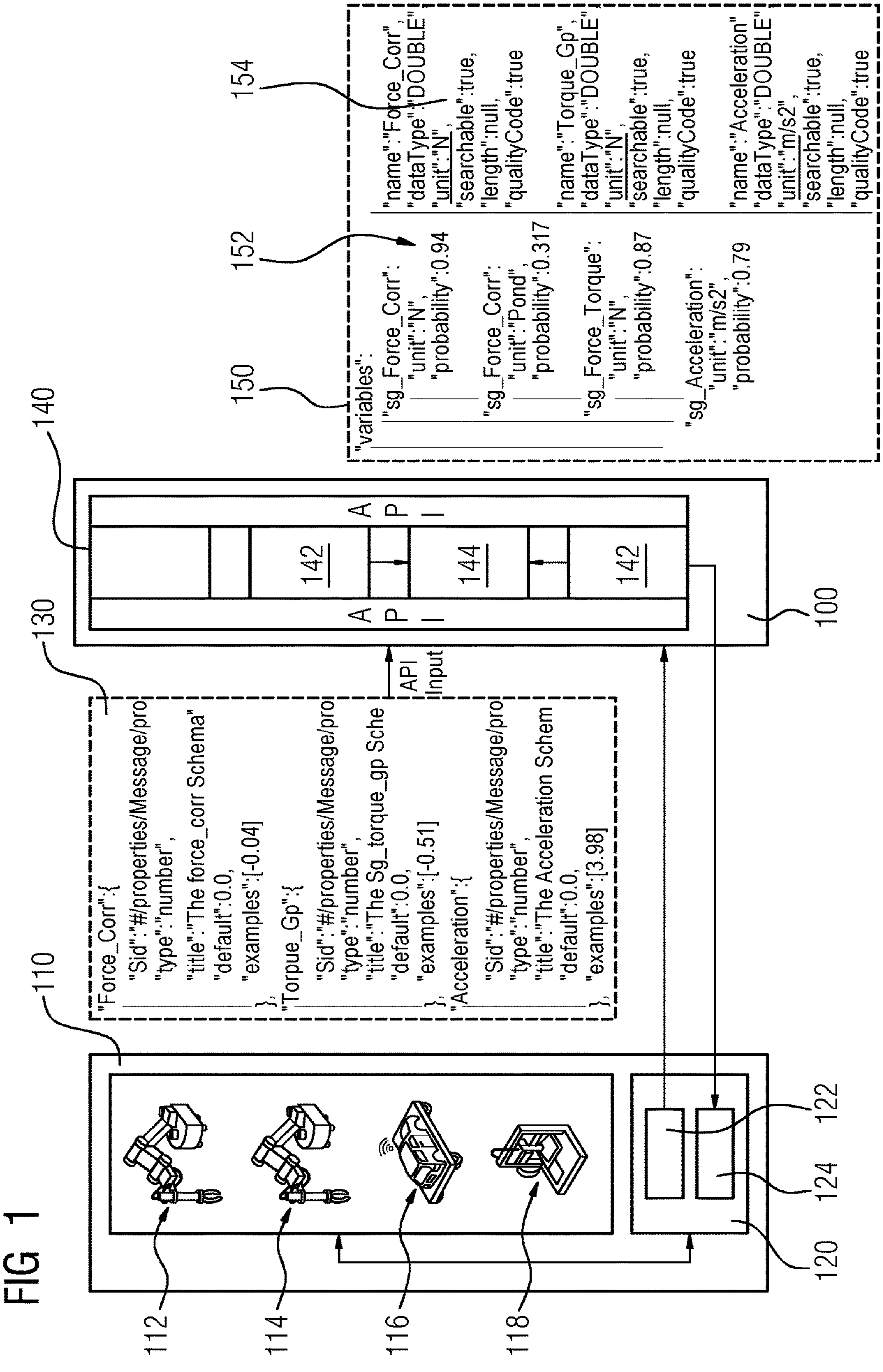
FIG. 1 illustrates a system for monitoring an industrial environment, according to an embodiment of the present invention.

FIG. 1 illustrates a system for monitoring an industrial environment 110, according to an embodiment of the present invention. According to FIG. 1, the industrial environment is a manufacturing plant 110 used to manufacture products such as Computer hardware, Airplanes, Automobiles, Consumer goods (Toiletries, Clothing, Home Appliances), Steel, Medical Products, etc.

The manufacturing plant 110 includes assets or devices 112-118 such as robots 112, 114, an Automated Guided Vehicle (AGV) 116, a 3D printer 118. Based on the product manufactured in the manufacturing plant 110, the devices 112-118 may be configured to perform one or more actions/operations. The robots 112 and 114 may be configured to perform simple actions such as grip, pick, place or more complex actions such as fusing joints, grinding, deburring, or polishing actions. The AGV 116 may be configured to perform actions such as product loading, handling transportation of products or other goods in the manufacturing plant 110, tracking of products, barcode scanning. The 3D printer 118 may be configured to additively manufacture the products or parts of the products, for example by the use lasers or electron beams to fuse metal powders into complicated shapes.

According to FIG. 1, the devices 112-118 include sensors that are used to monitor the operation of the devices using an industrial control system 120. The industrial control system 120 is communicatively coupled to an IoT computing platform 100. As used herein "IoT computing platform" refers to a processing environment comprising configurable computing physical and logical resources, for example, networks, servers, storage, applications, services, etc., and data distributed over the network, for example, the internet. The IoT computing platform provides on-demand network access to a shared pool of the configurable computing physical and logical resources. The network is, for example, a wired network, a wireless network, a communication network, or a network formed from any combination of these networks. The IoT computing platform may be realized on the Cloud or closer to the manufacturing plant 110 (i.e., within the network of the manufacturing plant 110).

The industrial control system 120 includes a data acquisition unit 122 configured to receive data from the sensors on the devices 112-118. Further, the data acquisition unit 122 is configured to generate metadata 130. The metadata may be in multiple formats Ecological Metadata Language (EML), HyperText Markup Language (HTML) or Extensible Markup Language (XML). In an embodiment, the metadata 130 over a period of time may be stored on the IoT computing platform 100. The IoT computing platform 100 is configured to operate on the metadata which is coming from manufacturing plant 110 (devices 112-118) and/or virtualized systems (simulation software, Product Lifecycle Management software, etc.).

As used herein "unit" (such as data acquisition unit/condition monitoring unit) include machine executable instructions that are executed by a processor. The execution of the instructions can be implemented in multiple methods. In an embodiment, the "unit" may be implemented in a microservice-based architecture. A person skilled in the conventional art would appreciate that this understanding of unit carries to FIG. 2.

The industrial control system 120 also includes a condition monitoring unit 124 configured to analyze and visualize augmented metadata 150. In an embodiment, the condition monitoring unit 124 is configured to determine operating conditions associated with the devices 112-118 and/or with the process performed by the devices 112-118 individually or in combination based on the augmented metadata 150. Further, the condition monitoring unit 124 may be configured to determine a predicted error condition in the devices 112-118 and/or the process based on the operating conditions. Furthermore, the condition monitoring unit 124 is configured to generate control signals to modify one or more control parameters of the devices 112-118 or to modify one or more process parameters for carrying out the process in the industrial environment based on the predicted error condition.

The augmented metadata 150 enables accurate analysis and visualization of the manufacturing plant 110. The generation of the augmented metadata 150 is performed by executing a data-augmentation module 140 hosted on the IoT computing platform 100. As shown in FIG. 1, the implementation of the data-augmentation module 140 may be encapsulated behind a RESTful (architectural style for an application program interface (API) that uses HTTP requests to access and use data from the data acquisition unit 122). Further, the data-augmentation module 140 may include an API which will provide the augmented metadata 150 to the condition monitoring unit 124.

The data-augmentation module 140 relies on the data collected/stored on the IoT computing platform 110 from different industrial environments in wide variety of use cases across different verticals. The IoT computing platform 110 is configured large numbers of predefined data types which already have been classified and serve as a training dataset 142. In an embodiment, the training dataset 142 is stored in the IoT computing platform 110 and can be used to extract the orders of magnitude typical for the selected process and heuristically determine if a unit identifier is e.g., nanometer, millimeter, or centimeter. Further, the training dataset 142 is also labelled to include variations in the unit identifier for example Temperature in ° ° C. in Europe or Asia, ° F. in United States etc.

In operation, the metadata 130 and the training dataset 142 are provided as input to a classification module 144. The classification module 144 is configured to classifying datapoints of the metadata 130 environment into one or more classes. The classes may be associated with a physical quality identifier, one of a location identifier and a device identifier associated with generation of the datapoints, and/or the unit identifier.

In FIG. 1, the classification is performed for the unit identifier as an example. The classification module 144 is further configured to augmenting the metadata 130, based on the classification, to include the unit identifier 154 along with an associated confidence metric 152. In an embodiment, the confidence metric (152) is used to determine the classification. As shown in FIG. 1 two units are predicted for the "Force_Corr", however, unit "N" (154) is selected in view of the higher probability/confidence metric.

The steps performed by the classification module 144 is further elaborated in FIG. 3.

Figure 2:
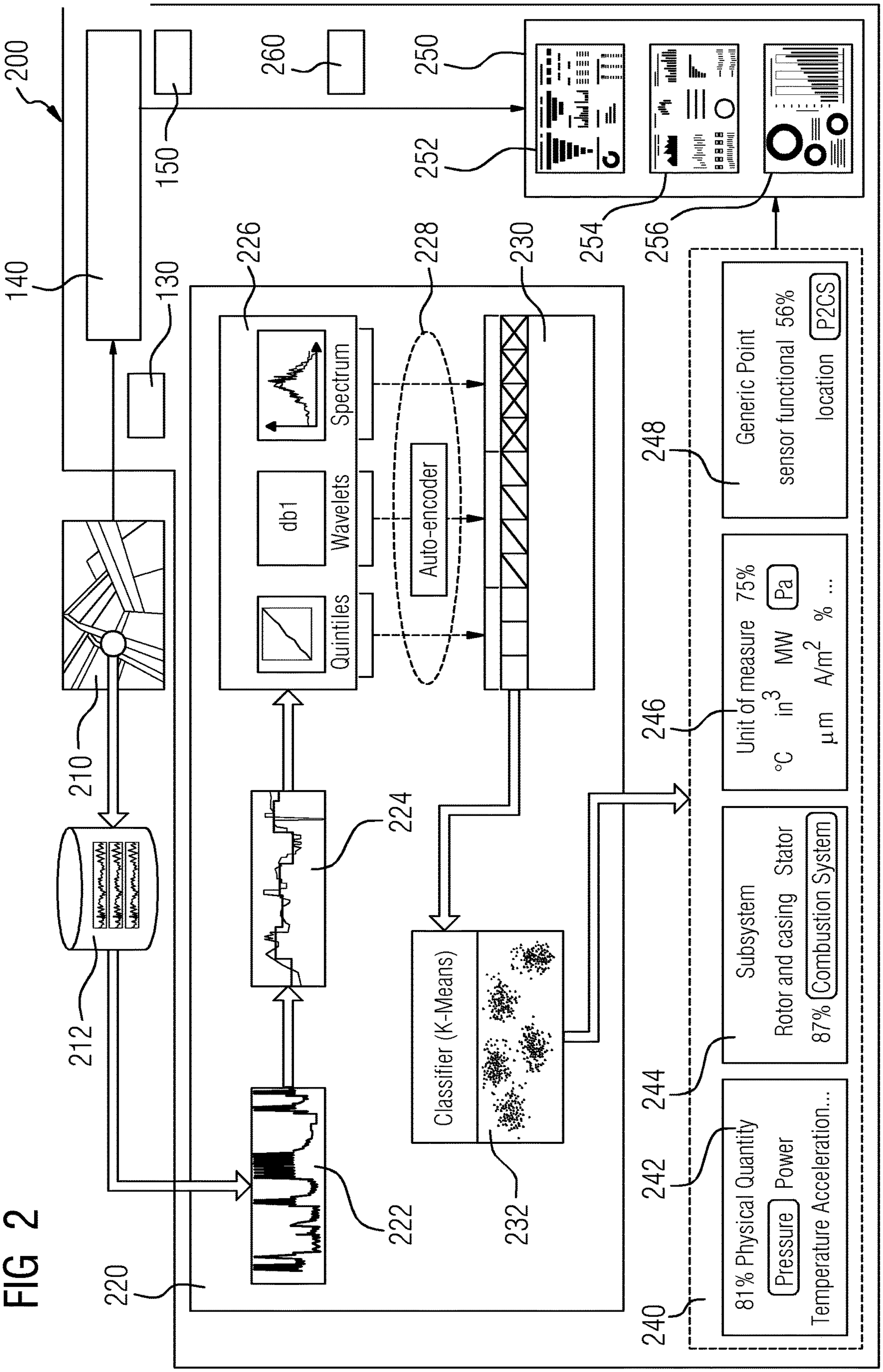
FIG. 2 illustrates a system for monitoring an industrial environment, according to an embodiment of the present invention.

FIG. 2 illustrates a system 200 for monitoring an industrial environment 210, according to an embodiment of the present invention. In FIG. 2, the industrial environment is a power plant 210 comprising Large Gas Turbines (LGTs) with sensors. The system 200 may receive sensor data from a plurality of turbines over a period of time. The sensor data is referred as historical sensor data and may be stored in a sensor database 212 communicatively coupled with the system 200. In an embodiment, the system 200 may include a data lake that is configured to extract the historical sensor data from the sensor database 212. The sensor database 212 is configured to not only store the historical sensor data but also receive and store time-series sensor datapoints from the sensors of the LGTs in the power plant 210.

The system 200 includes the data-augmentation module 140, configured to receive metadata 130' associated with the power plat 210. As indicated in FIG. 1 and elaborated in FIG. 3, the data-augmentation module 140 is configured to generate the augmented data 150' in response to the metadata 130'. FIG. 2, also addresses a scenario where there is no metadata 130' associated with the power plant 210.

The system 200 includes a sensor classification unit 220. The sensor classification unit 220 is configured to receive the sensor datapoints from the LGTs in the power plant 210 and predict at least one of classes 242-248 along with an associated confidence metric. In an embodiment, as shown in FIG. 2, the sensor classification unit 220 includes modules 222-232, to predict the classes 242-248. The modules 222-232 include a segmentation module 222, a pre-processing module 224, feature extractor module 226, feature vector module 228, an embedding module 230 and a classification module 232.

The segmentation module 222 is configured to extract one or more segment of the sensor datapoints for a predefined time period. The predefined time period may be set by an operator to the LGTs or may be learnt using machine learning models based on the quality of the prediction of the classes 242-248.

The pre-processing module 224 is configured to process the segment of sensor datapoints by filtering, resampling and/or interpolating the sampled sensor datapoints. The raw sensor datapoints from the LGTs may not be appropriate for data analysis. For example, they may have irregular timestamps grid, gaps and outliers. By processing the sensor datapoints the quality of the prediction of the classes 242-248 is improved.

The feature extractor module 226 may include multiple Feature Extractors and is configured to extracting features from the processed sensor datapoints. Each Feature Extractor may be configured to perform signal processing to extract features of the processed sensor datapoints.

The number and types of the feature extractors depend on the nature of the signal and target classes. As shown in FIG. 2, the Feature Extractors include a quantile distributor, a wavelet decomposer, and a spectrum analyser. Accordingly, the feature extractor module 226 is configured to generate quantile distribution, frequency spectrum, and/or wavelet decomposition, of the processed sensor datapoints and extract the features in the quantile distribution, the frequency spectrum, and/or the wavelet decomposition.

The feature vector module 228 is configured to reduce the features extracted by the feature extraction module 226 to feature vectors based on a predefined feature length. The output of each Feature Extractor is reduced to a "feature vector" (or matrix) of a fixed length. The length is specific to the Feature Extractor and is configured to be shorter than original time series yet representative. This is reached by either explicitly configuring the output size of the Feature Extractor or by using the Auto-Encoder as illustrated in FIG. 3. As shown, the feature vector module 228 is implemented as an Auto-Encoder configured to receive the features from the quantile distributor, the wavelet decomposer, and the spectrum analyser to generate respective feature vectors with lengths 3, 4, 4 respectively.

The embedding module 230 is configured to concatenate the feature vectors based on the extent by which the feature vectors enable discrimination of the sensor datapoints. The steps of processing the sensor datapoints and generation of the features and consequently the feature vectors ensure that the most representative features of the sensor datapoints are embedded. The representative features enable classification of the sensor datapoints into the classes 242-248.

The classification module 232 includes a trained model to classify the representative features into the classes 242-248. The trained model is trained based on the training dataset including the historical sensor data. The classification module 232 configured to define the classes 242-248 as output of the trained model based on a requirement of the operator of the LGTs. In an embodiment, the classification module 232 is configured to determine clusters in the sensor datapoints based on the metadata and representative features generated by the embedding module 230. The clusters may be generated using K-means clustering model. In another embodiment, the classification may be performed using an ensemble tree model and a neural network model. Accordingly, the trained model may be K-means clustering model, an ensemble tree model, a neural network model or a combination thereof.

The classification module 232 is further configured to determine the confidence metric for the classes, wherein the confidence metric is represented as a percentage indicating confidence of the classes predicted by the trained model. In an embodiment where clusters are generated, the classification module is configured to determine the confidence metric based on distances of the between the feature vector and cluster centers of K-means clusters generated by the K-means clustering model in response to the feature vectors. In another embodiment, the classification module 232 is configured to determine the confidence metric as probabilities of the classes predicted by the neural network in response to the feature vectors. Accordingly, the output of the classification module 232 is an augmented sensor dataset 240 including the classes 242-248. As shown in FIG. 2, the classes are the physical quality class 242, the location class 244, the device class 246, and the unit of measure class 248.

The augmented sensor data 240 and the augmented metadata 150' (referred in combination as augmented industrial dataset) are received at a condition monitoring application 250 of the system 200. The condition monitoring application 250 is configured to generate visualizations 252, 254 and 256 from the augmented industrial dataset. The condition monitoring application 250 may be further configured to predict an error condition in the LGTs based on the augmented dataset. In some embodiments, the condition monitoring application may be configured to generate control signals to modify the operating parameters of the LGTs.

The system 200 may also include a Graphical User Interface (GUI) 260 communicatively coupled to the sensor classification unit 220, the data-augmentation module 140 and the condition monitoring application 250. The GUI 260 is configured to display the augmented industrial dataset along with the associated confidence metric. The augmented industrial dataset may be displayed with the classes 242-248 tagged as suggestions, as illustrated in FIG. 5.

The classification performed by the sensor classification unit 220 and the data-augmentation module 140 may be validated using the GUI 260 by receiving a feedback from the operator (or any user/expert) of the LGTs. Based on the feedback the trained model may be tuned.

Apart from displaying the augmented industrial dataset, the GUI 260 is configured to display the visualizations 252, 254 and 256 generated by the condition monitoring application 250. Furthermore, the GUI 260 may also be used to interactively receive inputs to modify parameters of the trained model and/or the Feature Extractors.

FIG. 3 illustrates a method 300 of augmenting an industrial dataset, according to an embodiment of the present invention. In FIG. 3, the industrial dataset is the metadata 130 associated with the manufacturing plant 110.

In embodiments, the method 300 begins at step 312 by receiving the metadata 130 at the data-augmentation module 140. The metadata 130 includes a variable name (Force), asset/device type (robot/AGV), data type, metadata title, etc. At step 314, the metadata 130 is clustered using clustering model (such as K-means clustering). The clustering model is trained based on known metadata. The known metadata may be part of the training dataset and is validated mapping of metadata with the classes. At step 316, the clusters identified in step 312 are mapped onto the classes, such as classes 242-248. At step 318, the classes are predicted based on the probability associated with mapping. For example, the data-augmentation module 140 predicted the unit of measure for the variable "Force" as "N" and "Pond". The predicted unit of measure output by the data-augmentation module 140 is "N" in view of the higher probability of 0.94.

Method 300 also considers a scenario where time-series data from the manufacturing plant 110 is available. At step 320, the availability of the time-series data is checked. The time-series data can also be data from a lapsed time period (e.g., historical time-series sensor data) or streaming time-series data. Accordingly, the time-series data acts like the training dataset. If the time-series data is available, step 322 is performed. At step 322, orders of magnitude for the time-series data is determined. Further, at step 322 the orders of magnitude for the metadata 130 is compared with orders of magnitude for the classes in the training dataset. In an embodiment, the orders of magnitude for the class associated with the unit identifier is compared with the orders of magnitude of the time-series data. Furthermore, the unit identifier associated with the metadata 130 is inferenced heuristically based on the comparison. The output of the heuristic inferencing is collated at step 324 and the augmented metadata 150 is generated. At step 326, the augmented metadata 150 is displayed with suggestions for the classes. For example, the unit identifier is displayed as a suggestion to an operator of the manufacturing plant 110. Further step 326 may include updating the training dataset to include the feedback from the operator. For example, the feedback may include accepting the class suggested.

FIG. 4 illustrates a method 400A of training a model for augmenting an industrial dataset and a method 400B of monitoring an industrial environment associated with the industrial dataset, according to an embodiment of the present invention.

In embodiments, the method 400A begins at step 410 by determining a training dataset from historical sensor datapoints and validated metadata, wherein the historical sensor datapoints and the validated metadata associated with the industrial environment and are annotated with classes. In other words, the training dataset is generated by identifying the historical sensor datapoints and the metadata that are validated and annotated with the classes.

Step 420 includes selecting one or more feature extractors, wherein the feature extractors perform at least one of quantile distribution, frequency spectrum, and wavelet decomposition. The selection of the feature extractors includes defining parameters of the feature extractors such as determining the boundaries of the quantile distribution. Further, step 420 includes determining features from the training dataset, wherein the features are determined from at least one of variability and distribution of the sensor datapoints, spectral histogram, and wavelets.

Step 430 includes training the model to output classes associated with at least one of the physical quality identifier, the location identifier, the device identifier, and the unit identifier in response to feature vectors determined from one or more feature extraction models. Step 430 also includes determining the feature vectors from the features. In an embodiment, step 430 includes auto-encoding, by an auto-encoder, features generated from the one or more feature extractors into feature vectors based on a predefined feature length. Furthermore, step 430 includes concatenating the feature vectors based on the extent by which the feature vectors enable discrimination of datapoints in the training dataset.

Step 440 includes validating the trained model by comparing an output of the trained model with the training dataset. The output of the trained model includes the predicted classes. As indicated hereinabove, the training dataset includes datapoints with validated mapping to the classes. Accordingly, the comparison of the output of the training dataset enables determination of the accuracy of the trained model. In some embodiments, step 440 may also include tuning the trained model by modifying the parameters of the feature extractors or the autoencoder to improve the accuracy of the output. In other embodiments, step 440 may also include changing the feature extractors used to improve the accuracy.

The trained model is employed in the method 400B for monitoring the industrial environment. In embodiments, the method 400B begins at step 450 by classifying datapoints of an industrial dataset associated with the industrial environment into the classes using the trained model. The classification of the datapoints may include multiple intermediate steps depending on the datapoints in the industrial dataset. For example, if the datapoints are sensor datapoints a combination of clustering and machine-learning may be performed to determine the classes. If the datapoints are metadata associated with the industrial environment, a combination of clustering and heuristic inferencing may be performed to determine the classes.

Step 450 may include determining clusters in the industrial dataset. The clusters are determined based on the metadata and/or representative features identified for the datapoints in the industrial dataset. In some embodiments, particularly when there is no metadata or the metadata is insufficient, representative features from the industrial dataset including the time-series sensor datapoints are used to determine the clusters. Step 450 may accordingly include determining the representative features.

In an embodiment, step 450 may include extracting one or more segment of the sensor datapoints for a predefined time period and processing the segment of sensor datapoints by filtering, resampling and/or interpolating the segmented sensor datapoints.

Step 450 may further include extracting features from the processed sensor datapoints by generating at least one of quantile distribution, frequency spectrum, and wavelet decomposition, of the processed sensor datapoints and reducing the features to feature vectors based on a predefined feature length. The representative features are determined at step 450 by concatenating the feature vectors based on the extent by which the feature vectors enable discrimination of the industrial dataset, the sensor datapoints.

Step 450 may include determining the confidence metric based on distances of the between the feature vector and cluster centers of K-means clusters generated by the K-means clustering model in response to the feature vectors. In another embodiment, the step 450 may include determining the confidence metric as probabilities of the classes predicted by the neural network in response to the feature vectors. Embodiments of the present invention propose multiple methods of predicting the classes and the confidence metric that can be used individually and in combination.

In another embodiment, step 450 determining orders of magnitude for the training dataset and comparing the orders of magnitude for the datapoints with orders of magnitude for the classes, and the class associated with the unit identifier in the training dataset. Step 450 may further include inferencing heuristically the unit identifier associated with the datapoints based on the comparison.

Step 460 includes augmenting the industrial dataset, based on the classification, to include at least one of the physical quality identifier, the location identifier, the device identifier, and the unit identifier along with the associated confidence metric.

Step 470 includes monitoring one or more assets/devices or processes/operations performed in the industrial environment using the augmented industrial dataset. In an embodiment, step 470 may include displaying operating conditions associated with the asset and/or the process based on the augmented industrial dataset and displaying a predicted error condition in the asset and/or the process determined based on the operating conditions.

FIG. 5 illustrates a Graphical User Interface (GUI) 500 of a system for augmenting an industrial dataset for an industrial environment, according to an embodiment of the present invention. For the purpose of FIG. 5, the industrial environment is an Additive Manufacturing facility of an automotive plant.

The GUI 500 displays datapoints related to the Additive Manufacturing process in the fields 510-540. In an embodiment, the field 520 for the Unit of Measure and the field 540 for the Location identifier may be incomplete. The datapoints may include Physical identifier name 510 and Data type 530. The Physical identifiers listed in 510 may include Curing WaitTime, CurrentActualValue, ExposureTime, RetractSpeed, HeatFlow.

When operating the GUI 500, the operator of the Additive Manufacturing facility can generate the augmented industrial dataset with the fields 520 and 540 completed by clicking the tabs 522 and 542, respectively. The GUI 500 is configured to initiate execution of the method steps of embodiments of the present invention to generate the newly populated fields 524 and 544. Accordingly, based on the Physical Identifier 510, the Data type 530 and training data/time-series data, the fields 524 and 544 are determined. For example, the datapoints for CuringWaitTime relates to thermal curing of the 3D printed brake of a vehicle. Embodiments of the present invention determine the location of the datapoints to be generated from the sensor "Oven_timer1" and identifies the unit of measure to be seconds. The other examples are as illustrated in FIG. 5.

A person skilled in the conventional art would appreciate that the example GUI 500 displays the industrial dataset associated with an Additive Manufacturing process. The industrial dataset may vary based on the facility. For example, in a fabrication facility of the automotive plant, the Physical Identifier Name may include ContactWaitTime to indicate the duration for a probe to be in contact with a metal joint to fuse the joint. In another example, the industrial dataset may be related to the energy sources of the automotive plant. For example, the energy source may be a photovoltaic system located within the automotive plant.

The examples listed herein are for illustrative purposes to enable a person skilled in the conventional art to appreciate the versatile applicability of embodiments of the present invention. Embodiments of the present invention can take a form of a computer program product comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the conventional art.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of monitoring an industrial environment, the method comprising:

classifying datapoints of an industrial dataset associated with the industrial environment into one or more classes using a trained model, wherein the trained model is generated using training dataset, wherein the one or more classes are associated with at least one of a physical quality identifier, one of a location identifier and a device identifier associated with generation of the datapoints, and a unit identifier of the datapoints;

augmenting the industrial dataset, based on the classifying, to include at least one of the physical quality identifier, the location identifier, the device identifier, and the unit identifier along with an associated confidence metric represented as a percentage indicating confidence of the classifying;

monitoring operating conditions of at least one asset or at least one process in the industrial environment using the augmented industrial dataset; and generating control signals to modify at least one of one or more control parameters of the at least one asset and one or more process parameters for carrying out the at least one process in the industrial environment based on the monitoring.

2. The method according to claim 1, wherein the industrial dataset comprises at least one of:

sensor datapoints generated by sensors in the industrial environment;

metadata in the sensor datapoints and/or from at least one of simulation models, lifecycle database, and manufacturing operations database, wherein the metadata comprises at least one of variable identifier, an asset identifier, and an asset type; and wherein the datapoints of the industrial dataset comprises the sensor datapoints and the metadata.

3. The method according to claim 1, wherein the training dataset is a validated dataset associated with the industrial environment comprising a mapping of historical sensor datapoints from the industrial environment and the metadata to the classes.

4. The method according to one of claim 1, further comprising:

determining clusters in the industrial dataset based on at least one of the metadata and representative features identified for the datapoints in the industrial dataset.

5. The method according to claim 1, further comprising:

extracting one or more segment of the sensor datapoints for a predefined time period; and processing a segment of sensor datapoints by filtering, resampling and/or interpolating the segmented sensor datapoints.

6. The method according to claim 1, further comprising extracting features from the processed sensor datapoints, wherein extracting the features comprises:

generating at least one of quantile distribution, frequency spectrum, and wavelet decomposition, of the processed sensor datapoints; and extracting the features in at least one of the quantile distribution, the frequency spectrum, and the wavelet decomposition of the processed sensor datapoints.

7. The method according to claim 6, further comprising:

reducing the features to feature vectors based on a predefined feature length; and determining the representative features by concatenating the feature vectors based on the extent by which the feature vectors enable discrimination of the industrial dataset, the sensor datapoints.

8. The method according to claim 1, wherein classifying datapoints of the industrial dataset into one or more classes using the trained model further comprises:

defining the one or more classes as outputs of the trained model;

predicting the one or more classes by the trained model in response to the feature vectors, wherein the trained model comprises at least one of K-means clustering model, an ensemble tree model and a neural network model; and determining the confidence metric for the classes, wherein the confidence metric is represented as a percentage indicating confidence of the classes predicted by the trained model.

9. The method according to claim 1, wherein determining the confidence metric for the classes comprises:

determining the confidence metric based on distances of the between the feature vector and cluster centers of K-means clusters generated by the K-means clustering model in response to the feature vectors; and determining the confidence metric as probabilities of the classes predicted by the neural network in response to the feature vectors.

10. The method according to claim 1, wherein classifying datapoints of the industrial dataset into one or more classes using the trained model further comprises:

determining orders of magnitude for the training dataset;

comparing the orders of magnitude for the datapoints with orders of magnitude for class associated with the unit identifier in the training dataset; and inferencing heuristically the unit identifier associated with the sensor datapoints based on the comparison.

11. The method according to claim 1, further comprising:

displaying the classes and the associated confidence metric;

validating the classes based on feedback from a user of a system for monitoring the industrial environment; and retraining the trained model based on the feedback.

12. A method of training the trained model according to claim 1, the method comprising:

determining the training dataset from the historical sensor datapoints and the metadata, wherein the historical sensor datapoints and the metadata are annotated with the classes;

selecting one or more feature extractors, wherein the feature extractors perform at least one of quantile distribution, frequency spectrum, and wavelet decomposition;

training the trained model to output the classes associated with at least one of the physical quality identifier, the location identifier, the device identifier, and the unit identifier in response to the feature vectors determined from one or more feature extraction models; and validating the trained model by comparing an output of the trained model with the training dataset.

13. The method according to claim 12, further comprising:

auto-encoding, by an autoencoder, features generated from the one or more feature extractors into feature vectors based on a predefined feature length, wherein the features are determined from at least one of variability and distribution of the sensor datapoints, spectral histogram, and wavelets.

14. The method according to claim 13, further comprising:

concatenating the feature vectors based on the extent by which the feature vectors enable discrimination of datapoints in the training dataset.

15. The method according to claim 1, wherein monitoring at least one asset or at least one process in the industrial environment using the augmented industrial dataset comprises:

displaying the operating conditions associated with the asset and/or the process based on the augmented industrial dataset; and displaying a predicted error condition in the asset and/or the process determined based on the operating conditions.

16. The method according to claim 15, wherein the control signals:

modify one or more control parameters of the asset based on the predicted error condition; and modify one or more process parameters for carrying out the process in the industrial environment based on the predicted error condition.

17. The method according to claim 1, further comprising:

receiving a plurality of industrial datasets associated with one or more industrial environments at a computing platform, wherein the computing platform is configured to perform the method.

18. A system for monitoring an industrial environment, the system comprising:

at least one processor; and at least one memory unit communicatively coupled to the processor configured to store machine readable instructions that when executed implement the method steps according to claim 1.

19. A computer program product, comprising a computer readable hardware storage device having computer readable program code stored therein, said program code executable by a processor of a computer system to implement a method according to claim 1.

20. A data stream of datapoints of industrial dataset associated with an industrial environment, wherein the data stream has at least partially been derived using methods according to claim 1.

* * * * *